Figure 1:
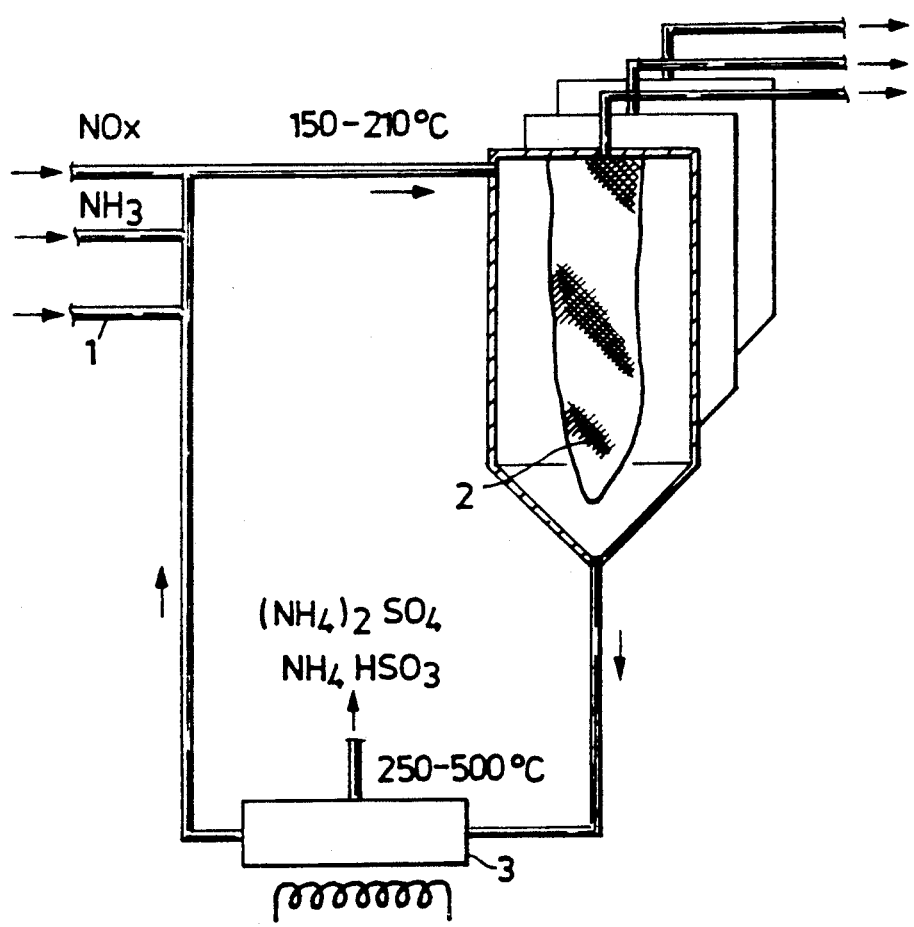

United States Patent [19]

Järas et al.

[11] Patent Number: 5,064,792
[45] Date of Patent: Nov. 12, 1991

[54] CATALYST FOR THE REDUCTION OF NITROGEN OXIDES, A METHOD FOR ITS PREPARATION AND THE USE THEREOF

[75] Inventors: Sven G. Järas; Marek T. Tokarz, both of Kungälv; Börje Persson, Angered, all of Sweden

[73] Assignee: Eka Nobel AB, Surte, Sweden

[21] Appl. No.: 484,809

[22] Filed: Feb. 26, 1990

[30] Foreign Application Priority Data

Feb. 27, 1989 [SE] Sweden ................ 8900684

[51] Int. Cl.$^5$ ............ B01J 21/06; B01J 29/04; B01J 23/22
[52] U.S. Cl. .................... 502/60; 502/242; 502/247
[58] Field of Search ............ 502/60, 239, 242, 247

[56] References Cited

U.S. PATENT DOCUMENTS

| 4,157,375 | 6/1979 | Brown et al. | 423/239 |
| 4,518,710 | 5/1985 | Brennan | 502/309 |
| 4,742,037 | 5/1988 | Baiker et al. | 502/247 |
| 4,847,058 | 7/1989 | Odenbrand et al. | 423/239 |
| 4,929,586 | 5/1990 | Hegedus et al. | 502/239 |

FOREIGN PATENT DOCUMENTS

| 18713 | 11/1980 | European Pat. Off. . | |
| 149966 | 7/1985 | European Pat. Off. | 502/242 |
| 219854 | 4/1987 | European Pat. Off. | 502/60 |
| 256590 | 2/1988 | European Pat. Off. . | |
| 0268265 | 5/1988 | European Pat. Off. . | |
| 268353 | 5/1988 | European Pat. Off. . | |
| 336882 | 10/1989 | European Pat. Off. . | |
| 77891 | 7/1978 | Japan | 502/247 |
| 31429 | 3/1980 | Japan | 502/242 |
| 139840 | 11/1980 | Japan | 502/242 |
| 232248 | 11/1985 | Japan | 502/60 |
| WO86/05712 | 10/1986 | PCT Int'l Appl. . | |
| 1424486 | 2/1976 | United Kingdom . | |

OTHER PUBLICATIONS

Database WPI, No. 77-63901Y-Derwent, Mitsui Toatsu Chem. Inc., London, GB.

Primary Examiner—Carl F. Dees
Attorney, Agent, or Firm—Burns, Doane, Swecker & Mathis

[57] ABSTRACT

The invention relates to a catalyst for the reduction of nitrogen oxides and comprises oxides of transition metals on a particulate carrier material, the catalyst comprising:

1) a carrier material consisting of small grains of an inorganic oxide,
2) a catalytic layer thereon containing $TiO_2$ and $V_2O_5$, and obtained by a separate or simultaneous coating of the components on the carrier material, the catalyst particles being in the order of 10–200 μm and the catalyst being intended to operate at temperatures of 150°–220° C.

The invention also relates to a method for the preparation of the catalyst, and the use thereof for the reduction of nitrogen oxides in gases at low temperatures.

12 Claims, 1 Drawing Sheet

CATALYST FOR THE REDUCTION OF NITROGEN OXIDES, A METHOD FOR ITS PREPARATION AND THE USE THEREOF

The invention relates to a catalyst for the reduction of nitrogen oxides in the treatment of nitrogen-containing gases with a reducing agent, especially for the reduction of nitrogen oxides in flue gases. The invention also relates to a method for the preparation of such a catalyst, and to the use thereof for treating gases containing unwanted nitrogen oxides.

BACKGROUND

Nitrogen oxides are produced, inter alia, on combustion of fossil fuels in consequence of oxidation of the molecular nitrogen in the combustion air, as well as in consequence of oxidation of nitrogen chemically bound in the fuel, and they may also be found in flue gases or exhaust gases from nitric acid production and refuse disposal units. In today's increasingly environment-conscious society, it is of great importance to be able to remove efficiently nitrogen oxides from gas flows, especially exhaust gas flows from the combustion of various fuels, such as coal, gas, oil and petrol. In most cases, the commercially interesting solutions are based on the principle of reducing the nitrogen oxides to nitrogen by means of a suitable reducing agent, usually ammonia, a suitable catalyst being used to achieve an increased turnover and a lowered reaction temperature.

A suitable catalyst material in such methods is based on a combination of one or more transition metals and a carrier material. This catalyst material may be applied on a carrier body containing long and narrow channels forming a honeycomb structure, see for example U.S. patent specification No. 4,157,375. This catalyst type, however, involves the risk of clogging of the channels if the dust separation is not efficient enough, and also the size of these catalysts constitutes a problem, because they take up much space, which means that the installation and operation thereof are expensive, especially in regeneration.

Therefore, also particulate or powdery catalyst material is used. U.S. patent specification No. 4,518,710 discloses a powdery catalyst for the reduction of nitrogen oxide at about 250°–450° C., and which, according to the Examples, may be used packed in a vertical column.

WO Specification No. 86/05712 discloses catalyst particles in the order of 20–200 $\mu$m for the reduction of nitrogen oxide at about 350°–450° C., the catalyst particles forming a suspension flow together with the treated gas when this is admitted to a reactor, whereupon the particles are separated therefrom after the reduction and recycled to the gas inflow position.

Similar catalyst materials are known from EP patent specification No. 268265, GB patent specification No. 1424486, U.S. patent specification No. 4847058, DE patent specification No. 3531809 and U.S. patent specification No. 4742037.

SE patent application No. 8700117-8 discloses a method for the reduction of nitrogen oxides in flue gases by means of ammonia and a powdery catalyst, the gas mixture being led through a suppression filter on whose surface a coating of catalyst material has accumulated, whereupon this material easily may be blown off for regeneration and thereafter reformed into a new catalytic layer.

This method is practically and economically advantageous in that the catalytic reaction can be carried out in already existing, inexpensive units, such as dust separators or filter traps. It is, however, desirable to find a catalyst fulfilling the requisite demands on pickup, layer build-up, and regeneration, at the same time as a high turnover can be achieved and a low temperature level be maintained.

THE INVENTION

According to the invention, it has been found that considerably lower reduction temperatures can be used with unaltered catalyst volumes, if the catalyst material employed comprises certain given components and has a certain particle size.

Thus, the invention relates to a catalyst with the distinctive features stated in the appended claims. The catalyst material is particulate and comprises:
1) a carrier material consisting of small grains of an inorganic oxide,
2) a catalytic layer thereon containing $TiO_2$ and $V_2O_5$ and obtained by a separate or simultaneous coating of the components on the carrier material, the size of the catalyst particles being in the order of 10–200 $\mu$m and the catalyst being intended to operate at temperatures of 150°–220° C., a specially preferred temperature being 170°–190° C.

In a preferred embodiment, the catalyst comprises:
1) a carrier material consisting of small grains of silica or zeolite,
2) a first coating thereon of $TiO_2$,
3) a second coating thereon of $V_2O_5$, the catalyst otherwise having the same distinctive features as the above-mentioned catalyst, and a particle size interval of 30–70 $\mu$m being especially preferred.

The catalyst according to the invention is chiefly intended to be applied as a catalytic powder layer on a dust separator by means of a nitrogen oxide-containing gas flow and to be regenerated discontinuously when recycled to the gas inflow.

A preferred embodiment of this method is shown in FIG. 1 of the drawing. As is apparent therefrom, the catalyst (1) is added, preferably discontinuously, to the nitrogen oxide-containing gas in the form of small grains or particles which are carried along by the gas flow. The catalyst grains are collected on a filter device (2), usually a so-called bag filter, until a suitably thick layer functioning as a catalytic layer has been formed in which the desired reduction reaction occurs. Such a catalytic layer can be used for one or several weeks. When regeneration is required, i e when the catalytic activity has decreased, the filter is shaken or blown through countercurrent with inert gas, such that the catalyst grains fall off. By arranging two or more bag filters in parallel, a continuous process may be obtained The catalyst is recycled to the gas inflow and regenerated while being recycled, by conducting it through an oven (3) at 250°–500° C., thereby to decompose, and to cause to depart in gas phase, any ammonium sulphates or other unwanted products that have deposited on the surface of the catalyst.

More specifically, the catalyst according to the invention may comprise a core of a carrier material consisting of an inorganic oxide, preferably silica or zeolite, having a pore volume of 0.5–3.5 $cm^3/g$, a first layer of $TiO_2$ and a second layer of $V_2O_5$ applied thereon, the weight ratio $TiO_2:V_2O_5$ being 0.15–0.25. The $V_2O_5$ content is 5–35% by weight of the total weight, more preferred 10–30 by weight. Especially preferred is a $V_2O_5$ content of about 15% by weight since the reduction activity attains a maximum at this level.

To further increase the activity of the catalyst according to the invention, one or more different promoters for an improved nitrogen oxide reduction may be added, and they are chosen amongst oxides, such as $Fe_2O_3$, $MoO_3$, $Na_2O$, $K_2O$, $CuO$, and $CuO_2$, the oxide $Fe_2O_3$ being especially preferred, of metals from groups 1, 6 and 8 of the Periodic Table. An amount of 0.2–2.0% by weight is suitable, and 0.5–1.0% by weight is especially preferred.

To reduce the activity-impeding effect of any remaining amounts of $SO_2$, the cataylst according to the invention may contain small amounts of an inhibitor for sulphur dioxide oxidation, consisting of one or more metal oxides, such as $WO_3$ or $GeO_x$ (in the form of $GeO$ or $GeO_2$, or both), from groups 4 and 6 of the Periodic Table, suitably 0.4–1.0% by weight.

Furthermore, the activity of the catalyst according to the invention can be raised by adding $(NH_4)_2SO_4$ or $(NH_4)HSO_4$, suitably 6–10% by weight. It should, however, be pointed out that the ammonium sulphates formed during the nitrogen oxide reduction and removed upon regeneration have a different structure and coating form.

A catalyst according to the invention has numerous advantages compared with prior art technique. The volume of a particulate catalyst is generally smaller than the volume of a conventional honeycomb catalyst which takes up about 10 times the volume of a particulate catalyst. If, as is desirable, the conventional reaction temperature of 300°–450° C. were to be reduced, the volume of a honeycomb catalyst would have to be increased to an unacceptable extent. Since a carrier material is used, it is possible to tailor the pore size and the specific surface of the particles. It is most advantageous when a single substance, such as silica or zeolite, is used for preparing the carrier. It is also economically favorable to concentrate the active substances at the surface of the particles. It has now become apparent that one may reduce the reaction temperature to 150°–200° C., while maintaining about the same catalyst volume as at traditional, higher reaction temperatures, if one uses the silica carrier grains chosen for the present catalyst and coated in the manner stated in the appended claims.

This low reaction temperature also has a number of advantages. Since the process has a lower energy consumption, and lower demands are made upon the material of the process equipment, the process becomes more economical. Furthermore, no $N_2O$ is obtained upon reaction at 150°–200° C., whereas an $N_2O$ content of 50–100 ppm is often obtained at 350°–400° C.

The invention also relates to a method for the production of said catalyst, the distinctive features of the method being stated in the method claim. Small carrier grains of an inorganic oxide, preferably silica or zeolite, having a pore volume of 0.5–3.5 $cm^3/g$ are coated with a catalytic layer containing $TiO_2$ and $V_2O_5$, the carrier material being coated with these components either in the form of separate layers or a simultaneous coating, the grain size and the layer thickness being chosen such that the particle size of the particulate catalyst material is 10–200 μm and the weight ratio $TiO_2:V_2O_5$ is 0.15–0.25. In a preferred method, the carrier grains are coated with a first layer of $TiO_2$ and a second layer of $V_2O_5$.

The invention also relates to the use of said catalyst for treating gases containing unwanted nitrogen oxides with ammonia to reduce these to nitrogen.

The invention is illustrated by the following Examples. Unless otherwise stated, percent means percent by weight. Some examples, in order to indicate a general level of efficiency, show measurement results after a few hours' operation with a catalyst according to the invention, while others show results after long-time operation, in order to comprise also the aging effect.

EXAMPLE 1

The preparation of a catalyst according to the invention.

4.8 kg $SiO_2$ with a particle size of 45 μm and 1.0 kg $TiOSO_4.8H_2O$ dissolved in water to 6.48 l was charged to a mixer. The mixture was treated with 30 l 1 M $NH_3$ during 10 min. and thereafter filtrated and washed with water for the removal of $SO_2{}^{2-}$ ions. During the night, the resulting mass was dried at 80° C. to a powder.

Then, 2.58 kg oxalic acid was dissolved in 8.17 l water and 1.20 kg $NH_4VO_3$ added thereto. The above-mentioned powder was charged to a mixer and 5.0 l of the prepared $V_2O_5$ solution was added. The resulting mass was dried at 50° C. during a few days and, after a stepwise increase in temperature, dried at 100° C. during three hours. Subsequently, 4.5 l of the $V_2O_5$ solution was added to the resulting powder which was dried overnight in an oven at 100° C. and, after a stepwise increase in temperature during 40 min. to 450° C., dried for another 1.5 hours at 450° C.

Thus, 5.9 kg catalyst comprising 81% $SiO_2$, 3.3% $TiO_2$ and 15.0% $V_2O_5$ was obtained. The nitrogen oxide-reducing activity of the prepared catalyst at 180° C. was 92.0%.

In analogous manner, catalysts with different $V_2O_5$ contents were prepared and the activity determined. The following results were obtained:

| % by weight $V_2O_5$ | Nitrogen oxide reduction, % |
| --- | --- |
| 10 | 83.5 |
| 15 | 92.0 |
| 20 | 87.5 |
| 25 | 80.0 |
| 30 | 83.0 |

From these results, it is apparent that the reduction activity of the catalyst reaches a maximum at contents about 15% $V_2O_5$, for which reason this content is preferred.

EXAMPLE 2

Two catalysts according to the invention were prepared with the following composition 71% $SiO_2$, 3.4% $TiO_2$, 25.0% $V_2O_5$, and with a particle size of 45 μm, one catalyst containing also an inhibitor of 0.6% $WO_3$.

The prepared catalysts were tested as to their nitrogen oxide-reducing activity at a temperature of 180° C in a reduction plant with a layer of catalyst particles formed on a filter, the values below being average values from a series of operations. After 5–6 hours, the activity of a catalyst with inhibitor was about 86–88%, whereas the activity of a catalyst without inhibitor was about 79–80%.

EXAMPLE 3

Two catalysts according to the invention were prepared with the following composition:

81.6% $SiO_2$, 3.4% $TiO_2$, 15.0% $V_2O_5$, and with a particle size of 45 μm, one catalyst containing also a promoter of 0.6% $Fe_2O_3$.

The prepared catalysts were tested as to their nitrogen oxide-reducing activity at a temperature of 180° C. in a reduction plant with a layer of catalyst particles formed on a filter, the values below being average values from a series of operations. After about 200 hours of operation, the nitrogen oxide-reducing activity of the catalyst with promoter was 98%, whereas the activity of the catalyst without promoter was 95-96%.

EXAMPLE 4

Three catalysts were prepared with a composition according to Example 2, $SiO_2$ being replaced by zeolite Y and no $WO_3$ having been added One catalyst was impregnated with 10% by weight $(NH_4)_2SO_4$ and another catalyst with 10% by weight $NH_4HSO_4$ as activity increasing agent.

The prepared catalysts were tested as to their nitrogen oxide-reducing activity at a temperature of 180° C. in a reduction plant with a layer of catalyst particles formed on a filter, the values below being average values from a series of operations. After 4 hours, the activity of a catalyst with $(NH_4)_2SO_4$ was 87%, and that of a catalyst with $NH_4HSO_4$ 81%, while the activity of a catalyst without any activity-increasing impregnation was only 60%.

Such a catalyst is suitably regenerated after about 200 hours during about 30 min. at about 450° C., and a new catalytic layer is then formed.

Since known honeycomb catalysts require completely different reduction devices, comparative tests are not realistic. It should, however, be pointed out that nitrogen oxide-reduction with such a conventional catalyst in a suitable reduction device cannot be carried out with an acceptable reaction degree and a reasonable catalyst volume at reaction temperatures below 275° C. On the other hand, the catalyst according to the invention, which is intended to be applied as a catalytic powder layer in a reduction device, may, as shown in the Examples, be used with excellent reaction results at temperatures below 200° C., considerable savings being made both in energy consumption and choice of material.

We claim:

1. A catalyst for the reduction of nitrogen oxides comprising:
   1) a carrier material consisting of small grains of an inorganic oxide,
   2) a catalytic layer thereon containing $TiO_2$ and $V_2O_5$ in a weight ratio $TiO_2$: $V_2O_5$: $V_2O_5$ of 0.15 to 0.25, and obtained by a separate or simultaneous coating of the components on the carrier material, the size of the catalyst particles being in the order of 10–200 μm and the catalyst being intended to operate at a temperature of 150°–220° C.

2. A catalyst as claimed in claim 1, wherein the carrier material consists of small grains of silica or zeolite.

3. A catalyst as claimed in claim 1, wherein the pore volume of the carrier material is 0.5–3.5 $cm^3/g$.

4. A catalyst as claimed in claim 1, wherein the catalytic layer consists of: 1) a first coating of $TiO_2$ on the carrier material, 2) a second coating of $V_2O_5$.

5. A catalyst as claimed in claim 1, wherein the $V_2O_5$ content is 5–35% by weight of the total weight.

6. A catalyst as claimed in claim 1, wherein the catalyst it also comprises one or more metal oxide promoters which are chosen amongst oxides of metals from groups 1, 6 and 8 of the Periodic Table, preferably $Fe_2O_3$, $MoO_3$, $Na_2O$, $K_2O$, $CuO$ or $Cu_2O$.

7. A catalyst as claimed in claim 1, wherein the catalyst also comprises a sulphur dioxide inhibitor consisting of one or more metal oxides from the groups 4 and 6 of the Periodic Table, preferably $WO_3$ or $GeO_x$.

8. A catalyst as claimed in claim 1, wherein the catalyst it also comprises an activitypromoting agent including $(NH_4)_2SO_4$ or $(NH_4)SHO_4$.

9. A method for the preparation of catalyst as defined in claim 1, wherein small carrier grains of an inorganic oxide are coated with a catalytic layer containing $TiO_2$ and $V_2O_5$ in a weight ratio $TiO_2:V_2O_5$ of 0.15 to 0.25, the coating is applied either in the form of separate layers or in the form of one simultaneous coating, and the grain size and the layer thickness are chosen such that the particle size of the resulting catalyst material is 10 to 200 μm.

10. A method as claimed in claim 9, wherein a first coating of $TiO_2$ is applied on the carrier material, and then a second coating of $V_2O_5$ is applied.

11. A catalyst as claimed in claim 2, wherein the pore volume of the carrier material is 0.5 to 3.5 $cm^3/g$.

12. A catalyst as claimed in claim 4, wherein the $V_2O_5$ content is 5 to 35% by weight of the total weight, and that the weight ratio $TiO_2:V_2O_5$ is 0.15 to 0.25.

* * * * *

UNITED STATES PATENT AND TRADEMARK OFFICE
CERTIFICATE OF CORRECTION

PATENT NO. : 5,064,792

DATED : November 12, 1991

INVENTOR(S) : Sven G. Jaras et al

It is certified that error appears in the above-identified patent and that said Letters Patent is hereby corrected as shown below:

Column 6, lines 6-7,
In claim 1, please delete "$TiO_2$: $V_2O_5$: $V_2O_5$ of 0.15 to 0.25" and insert therefor --$TiO_2$: $V_2O_5$ of 0.15 to 0.25--.

Signed and Sealed this

Thirtieth Day of March, 1993

Attest:

STEPHEN G. KUNIN

*Attesting Officer*  Acting Commissioner of Patents and Trademarks